United States Patent
Dudar et al.

(10) Patent No.: US 9,611,817 B2
(45) Date of Patent: Apr. 4, 2017

(54) FUEL VAPOR CANISTER PURGE USING REVERSIBLE VACUUM PUMP

(71) Applicant: Ford Global Technologies, LLC, Dearborn, MI (US)

(72) Inventors: Aed M. Dudar, Canton, MI (US); Dennis Seung-Man Yang, Canton, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 14/465,616

(22) Filed: Aug. 21, 2014

(65) Prior Publication Data

US 2016/0053725 A1 Feb. 25, 2016

(51) Int. Cl.
*F02M 25/08* (2006.01)
*F02D 41/00* (2006.01)
*B01D 53/04* (2006.01)
*B60K 15/035* (2006.01)
(Continued)

(52) U.S. Cl.
CPC .......... *F02M 25/089* (2013.01); *B01D 53/04* (2013.01); *B01D 53/0407* (2013.01); *B60K 15/03504* (2013.01); *B60W 20/00* (2013.01); *F02D 41/004* (2013.01); *F02D 41/0032* (2013.01); *B01D 2253/102* (2013.01); *B01D 2257/702* (2013.01); *B01D 2259/40086* (2013.01); *B01D 2259/4516* (2013.01); *B60K 2015/03514* (2013.01); *B60K 2015/03561* (2013.01); *F02M 25/0809* (2013.01); *F02M 25/0836* (2013.01); *F02N 11/0814* (2013.01)

(58) Field of Classification Search
CPC F02M 25/0836; F02M 25/089; F02D 41/004; F02D 41/0032; B01D 53/0407; B60K 15/03504; B60W 20/00
USPC ............... 701/107; 123/518–520; 73/114.38, 73/114.39
See application file for complete search history.

(56) References Cited

U.S. PATENT DOCUMENTS

| | | |
|---|---|---|
| 4,671,071 A | 6/1987 | Sasaki |
| 6,276,344 B1 | 8/2001 | Isobe et al. |
| 7,320,314 B2 | 1/2008 | Kashima et al. |

(Continued)

FOREIGN PATENT DOCUMENTS

EP 0969198 A2 1/2000

OTHER PUBLICATIONS

Dudar, Aed M. et al., "Systems and Methods for Managing Bleed Emissions in Plug-In Hybrid Electric Vehicles," U.S. Appl. No. 14/101,113, filed Dec. 9, 2013, 56 pages.

(Continued)

*Primary Examiner* — Hai Huynh
*Assistant Examiner* — Gonzalo Laguarda
(74) *Attorney, Agent, or Firm* — James Dottavio; McCoy Russell LLP (57) ABSTRACT

A method for a fuel system, comprising: during a first condition, purging fuel vapor from a fuel vapor canister to a fuel vapor accumulator; and then during a second condition, evacuating fuel vapor from the fuel vapor accumulator to a fuel tank. The fuel vapor accumulator increases the volume of the fuel system, providing a temporary storage for desorbed fuel vapor. In this way, canister breakthrough of hydrocarbons can be mitigated, thereby reducing bleed emissions.

17 Claims, 6 Drawing Sheets

(51) Int. Cl.
*B60W 20/00* (2016.01)
*F02N 11/08* (2006.01)

(56) References Cited

U.S. PATENT DOCUMENTS

| | | | |
|---|---|---|---|
| 8,245,699 B2 | 8/2012 | Peters et al. | |
| 8,495,988 B2 | 7/2013 | Reddy | |
| 2007/0062495 A1* | 3/2007 | Kano | F02D 41/0045 123/520 |
| 2011/0011472 A1* | 1/2011 | Mc Lain | F02M 25/0809 137/624.12 |
| 2011/0123372 A1* | 5/2011 | Itoh | F04B 35/04 417/410.1 |
| 2013/0037007 A1 | 2/2013 | Reddy | |
| 2013/0199504 A1* | 8/2013 | Takeishi | F02M 25/0809 123/520 |

OTHER PUBLICATIONS

Dudar, Aed M. et al., "Systems and Methods for Managing Bleed Emissions in Plug-In Hybrid Electric Vehicles," U.S. Appl. No. 14/101,168, filed Dec. 9, 2013, 58 pages.

Dudar, Aed M. et al., "Systems and Methods for Determining the Integrity of a Vehicle Fuel System," U.S. Appl. No. 14/155,254, filed Jan. 14, 2014, 46 pages.

Dudar, Aed M. et al., "System and Methods for a Leak Check Module Comprising a Reversible Vacuum Pump," U.S. Appl. No. 14/248,024, filed Apr. 8, 2014, 58 pages.

* cited by examiner

FUEL VAPOR CANISTER PURGE USING REVERSIBLE VACUUM PUMP

BACKGROUND AND SUMMARY

Vehicle emission control systems may be configured to store fuel vapors from fuel tank refueling and diurnal engine operations in a fuel vapor canister, and then purge the stored vapors during a subsequent engine operation. The stored vapors may be routed to engine intake for combustion, further improving fuel economy.

However, engine run time in hybrid vehicles (HEVs) may be limited, thus limiting engine manifold vacuum, which is typically used to draw fresh air through the fuel vapor canister to desorb the stored fuel vapors. Thus, opportunities for purging fuel vapor from the canister may also be limited. Even if purge conditions are met, the conditions may only be held for a short period of time, leading to incomplete purge cycles. This may result in residual fuel vapors stored in the canister for long periods of time. Typically, the canister is coupled to atmosphere while the vehicle is off. Over the course of a diurnal cycle, the fuel vapors may desorb from the canister as temperature rises, resulting in an increase in bleed emissions. The canister vent valve could be maintained closed, but the vent valve is typically a solenoid valve requiring constant power to stay shut, which could drain the battery if the vehicle is left off for a significant period of time. Further, even when the vehicle is turned back on, the engine may not be used, or may not be operated with an intake vacuum sufficient to purge the vapor canister to intake. Forcing the engine on to evacuate the canister would reduce the efficiency of the hybrid vehicle while increasing combustive emissions.

The inventors herein have recognized the above issues and have developed systems and methods to at least partially address them. In one example, a method for a fuel system, comprising: during a first condition, purging fuel vapor from a fuel vapor canister to a fuel vapor accumulator; and then during a second condition, evacuating fuel vapor from the fuel vapor accumulator to a fuel tank. The fuel vapor accumulator increases the volume of the fuel system, providing a temporary storage for desorbed fuel vapor. In this way, canister breakthrough of hydrocarbons can be mitigated, thereby reducing bleed emissions.

In another example, a fuel system for a vehicle, comprising: a fuel vapor accumulator coupled between a fuel tank isolation valve and a fuel vapor canister; and a reversible vacuum pump coupled between the fuel vapor canister and atmosphere. By incorporating both an accumulator and a reversible vacuum pump in to the fuel system, the system may realize an increased pressure gradient between a sealed fuel tank under vacuum from a diurnal cycle and the rest of the fuel system. In this way, a passive purge operation may return an increased amount of fuel vapor to the fuel tank.

In yet another example, a method for purging a fuel vapor canister, comprising: during a vehicle-off condition, desorbing fuel vapor stored in a fuel vapor canister to a fuel vapor accumulator by pumping air through the fuel vapor canister while maintaining a fuel tank isolation valve and a canister purge valve closed; closing a latchable canister vent valve; responsive to a fuel tank vacuum increasing above a threshold, opening the fuel tank isolation valve and latchable canister vent valve; and then responsive to a fuel tank pressure increasing above a threshold, closing the fuel tank isolation valve. The method enables a canister purge operation while the vehicle is off, leveraging ambient temperature decreases over a diurnal cycle to generate a fuel tank vacuum. In this way, a hybrid vehicle may purge a fuel vapor canister without forcing the engine on, thereby increasing overall fuel efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

This detailed description relates to systems and methods for managing evaporative emissions in a motor vehicle. In particular, this description relates to purging a fuel vapor canister by first actively desorbing the contents of the fuel vapor canister to a fuel vapor accumulator, then passively evacuating the contents of the fuel vapor accumulator to a fuel tank. The systems and methods may be applied to a hybrid vehicle, such as the hybrid vehicle schematically depicted in FIG. 1. The fuel vapor accumulator may be incorporated into a fuel system and evaporative emissions system for the hybrid vehicle, as depicted in FIG. 2. The evaporative emissions system may include a evaporative leak check module, comprising a reversible vacuum pump, enabling both leak testing of the fuel system and evaporative emissions system, as well as the active canister purge described herein. The evaporative leak check module may be operable in numerous configurations, such as the configurations shown in FIGS. 3A-3D. The reversible vacuum pump may be operable in a forward and reverse direction using a pump reversing circuit, as depicted in FIGS. 4A-4B.

Figure 5:
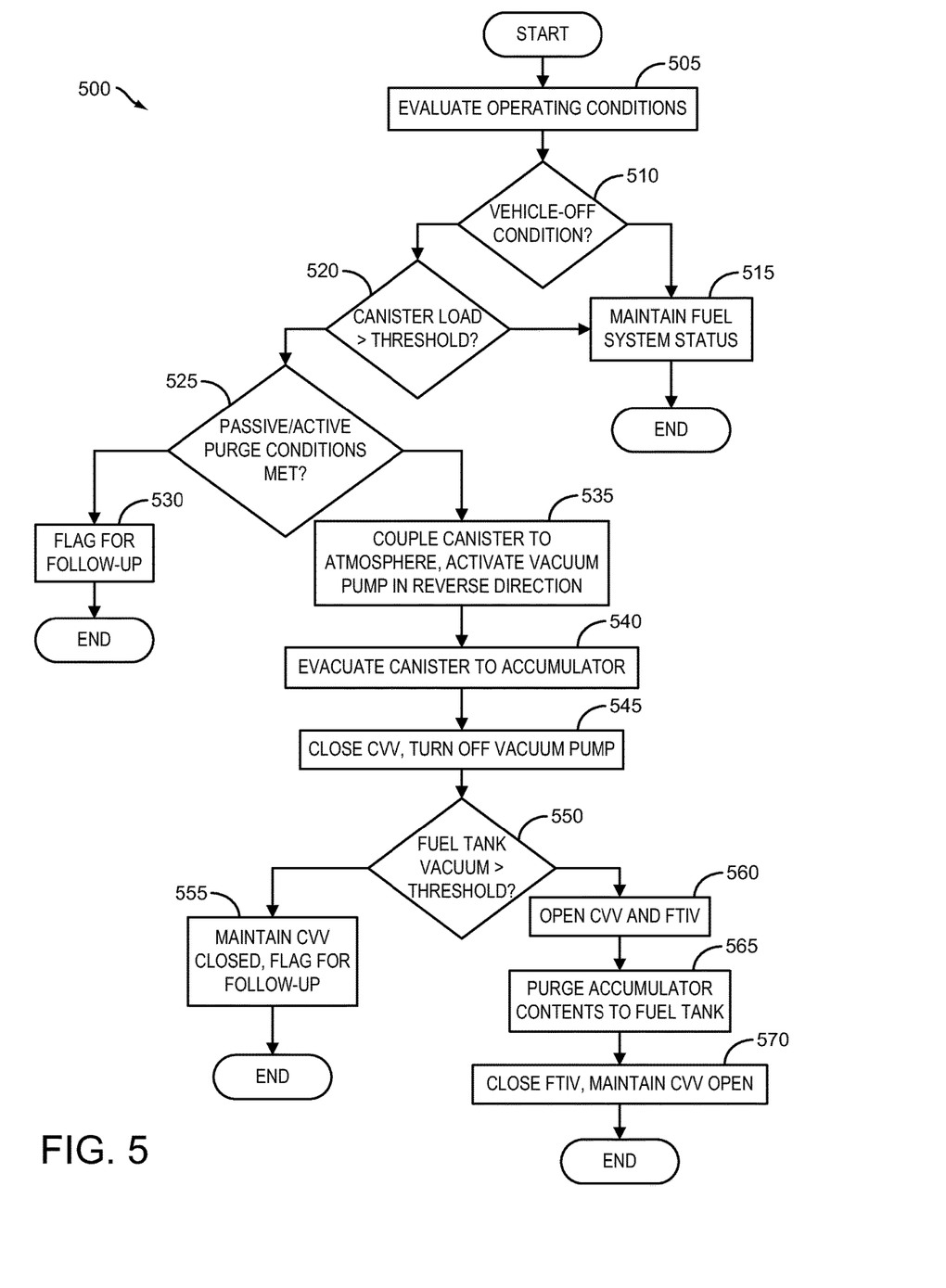
FIG. 5 shows an example flow chart for a high-level method for purging a fuel vapor canister with a reversible leak check module vacuum pump via a fuel vapor accumulator.
Figure 6:
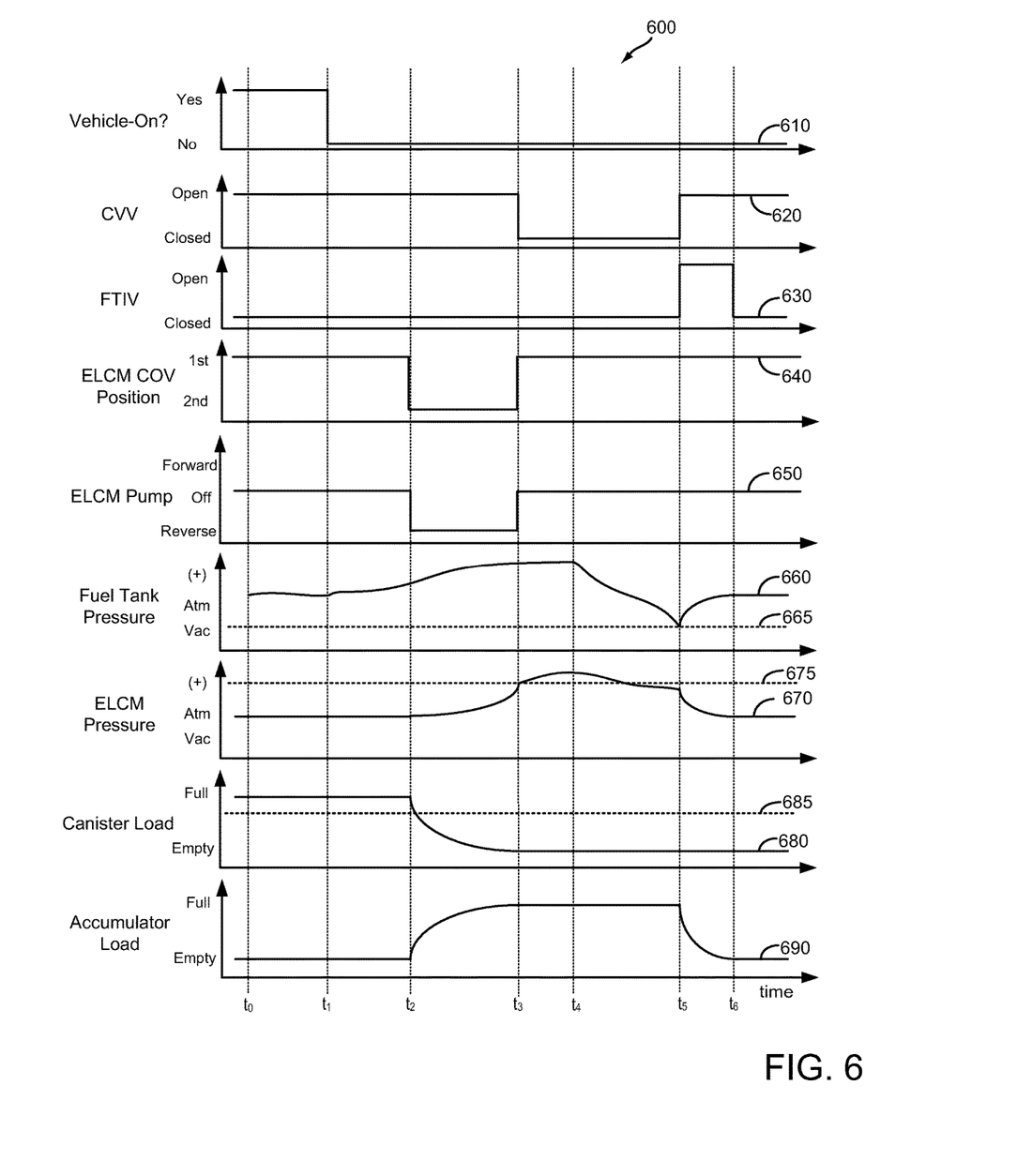
FIG. 6 shows an example timeline for a fuel vapor canister purge event using the method depicted in FIG. 5.

An example method for an active/passive purge routine is shown by a high-level flow chart in FIG. 5. An example timeline for such a method is shown in FIG. 6.

Figure 1:
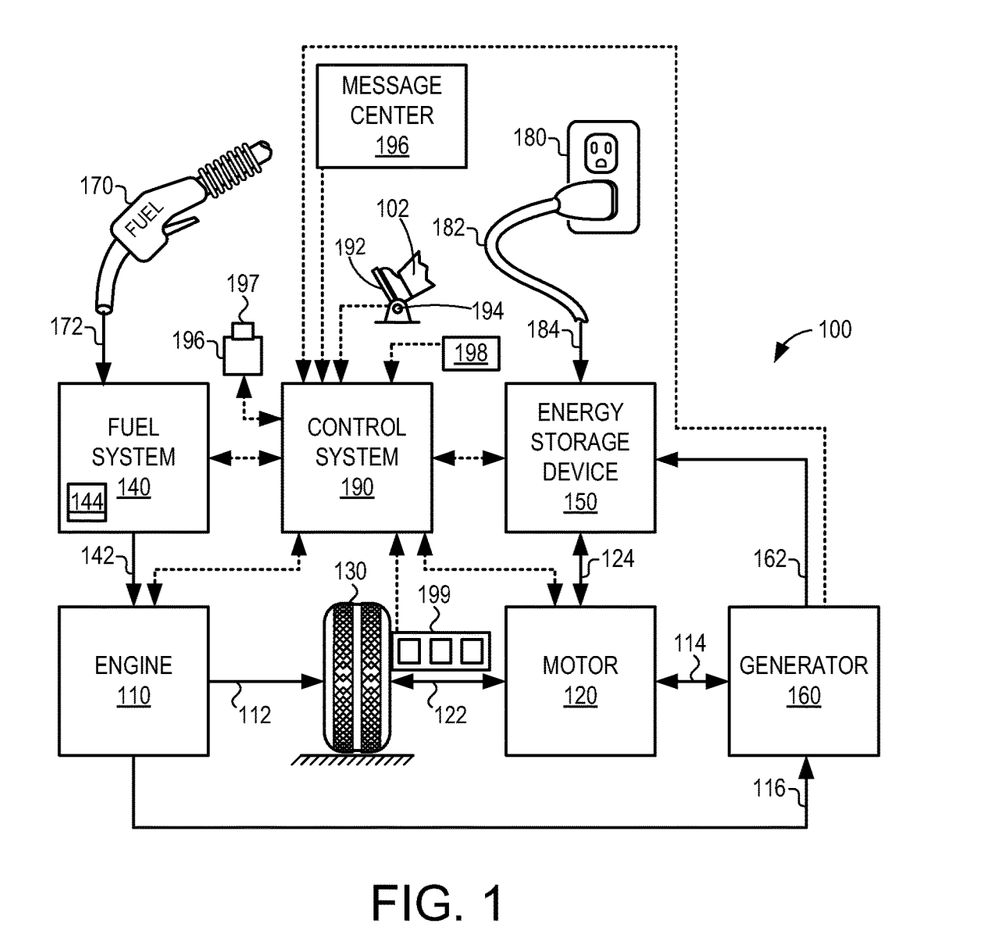
FIG. 1 schematically shows an example vehicle propulsion system.
Figure 2:
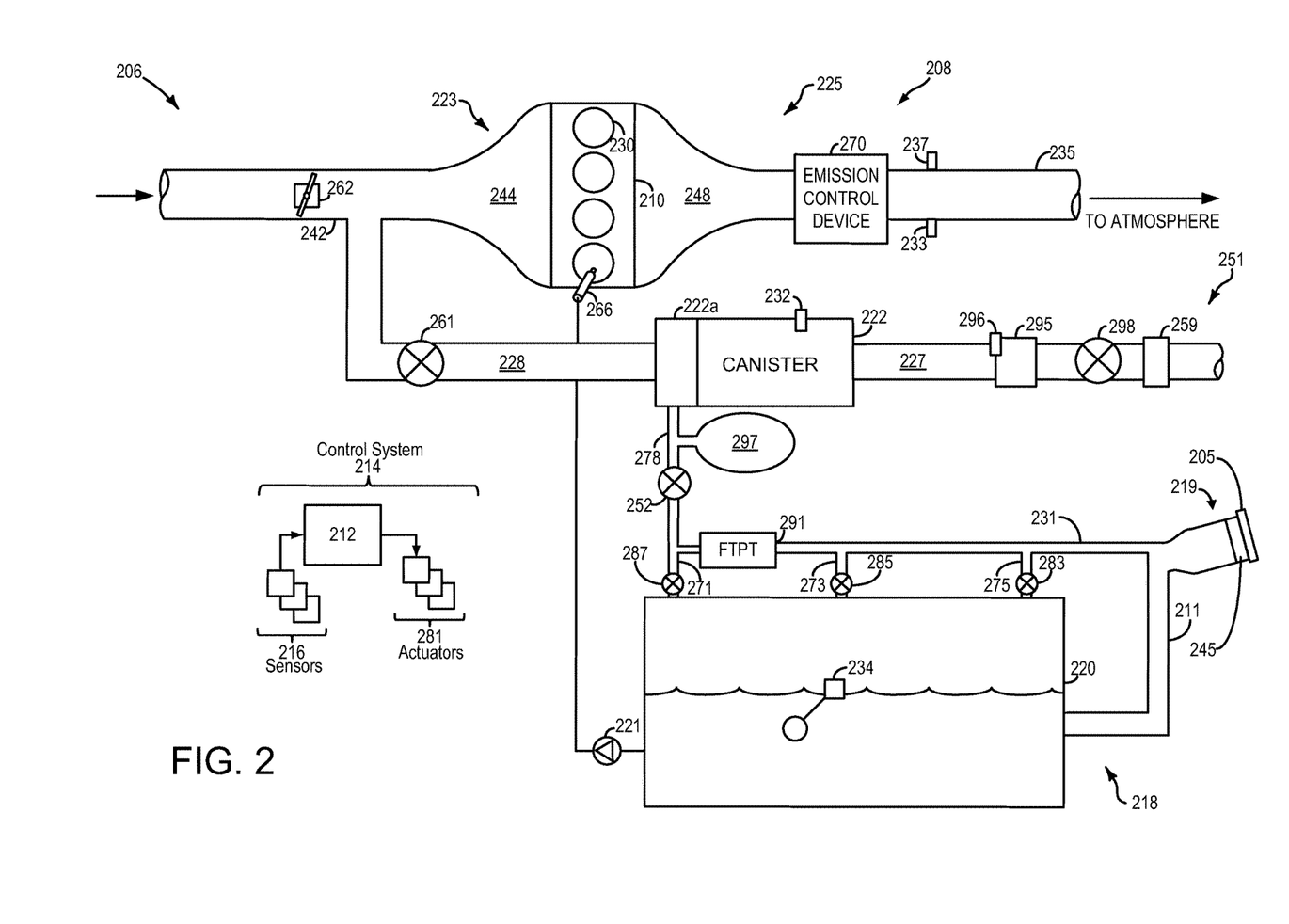
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIGS. 7 and 9, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and refueling lock 245. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 5.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system and/or emissions control system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed.

Emissions control system 251 may further include a fuel vapor accumulator 297 coupled to conduit 278 between FTIV 252 and canister 222. Fuel vapor accumulator 297 may be configured to temporarily store fuel vapor under pressure. As described further herein and with regard to FIGS. 5 and 6, ELCM pump 330 may apply a positive pressure on the emissions control system, thus desorbing the contents of canister 222. If the positive pressure is applied while CPV 261 and FTIV 252 are both closed, the desorbed fuel vapors will port to the fuel vapor accumulator. Emissions control system 251 may then be sealed by closing canister vent valve (CVV) 298, the positive pressure within the system thus favoring the retention of the fuel vapor within fuel vapor accumulator 297. Fuel vapor accumulator 297 may comprise a fixed volume, or may be an expandable chamber taking on a larger volume with increased pressure, such as a bladder. The accumulator may thus act to permanently or temporarily expand the effective volume of the emissions control system. In some examples, flow into and/or out of the accumulator may be regulated by a valve or other latching mechanism coupling fuel vapor accumulator 297 to conduit 278.

Canister vent valve 298 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 298 may be a solenoid valve wherein opening or closing of the valve is performed via actuation of a canister vent solenoid. In particular, the canister vent valve may be an open that is closed upon actuation of the canister vent solenoid. In some examples, CVV 298 may be configured as a latchable solenoid valve. In other words, when the valve is placed in a closed configuration, it latches closed without requiring additional current or voltage. For example, the valve may be closed with a 100 ms pulse, then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Figure 3A:
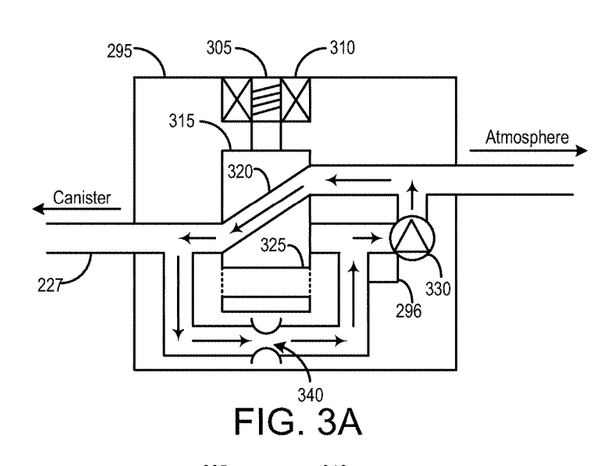
FIG. 3A shows a schematic depiction of an evaporative leak check module in a configuration to perform a reference check.
Figure 3B:
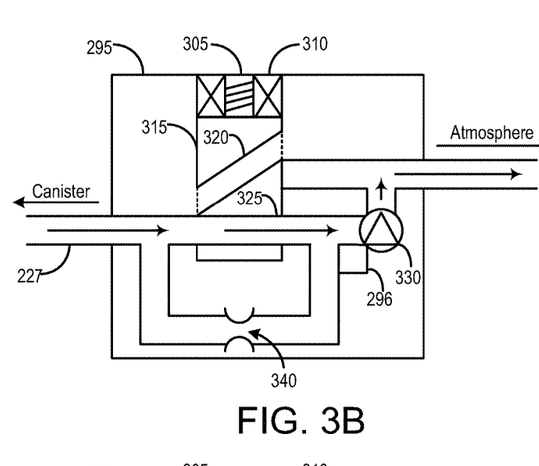
FIG. 3B shows a schematic depiction of an evaporative leak check module in a configuration to perform a fuel system evacuation leak check.
Figure 3C:
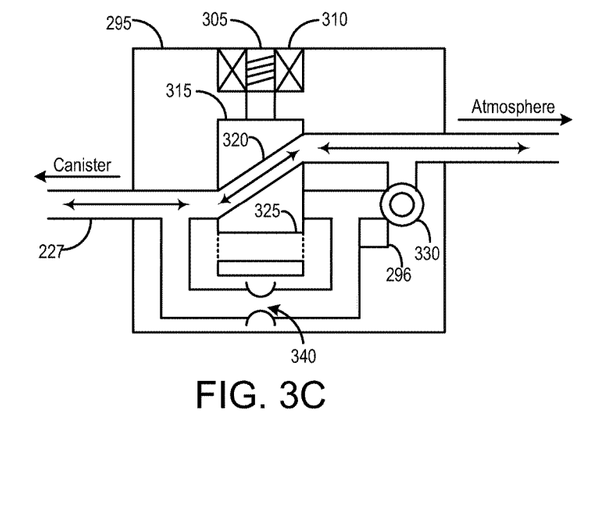
FIG. 3C shows a schematic depiction of an evaporative leak check module in a configuration to perform a purge operation.
Figure 3D:
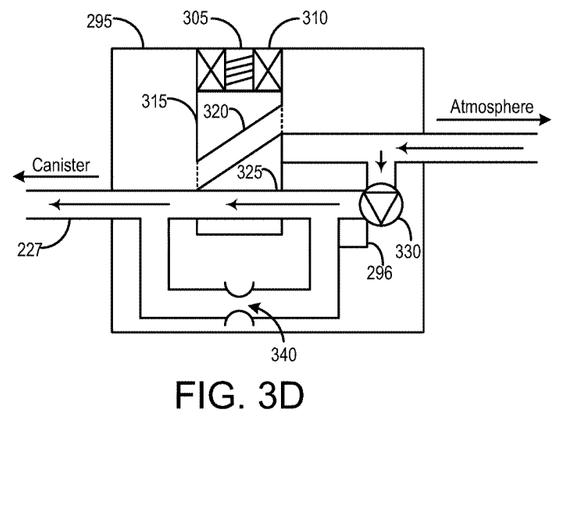
FIG. 3D shows a schematic depiction of an evaporative leak check module in a configuration to perform a passive purge operation.
Figure 4A:
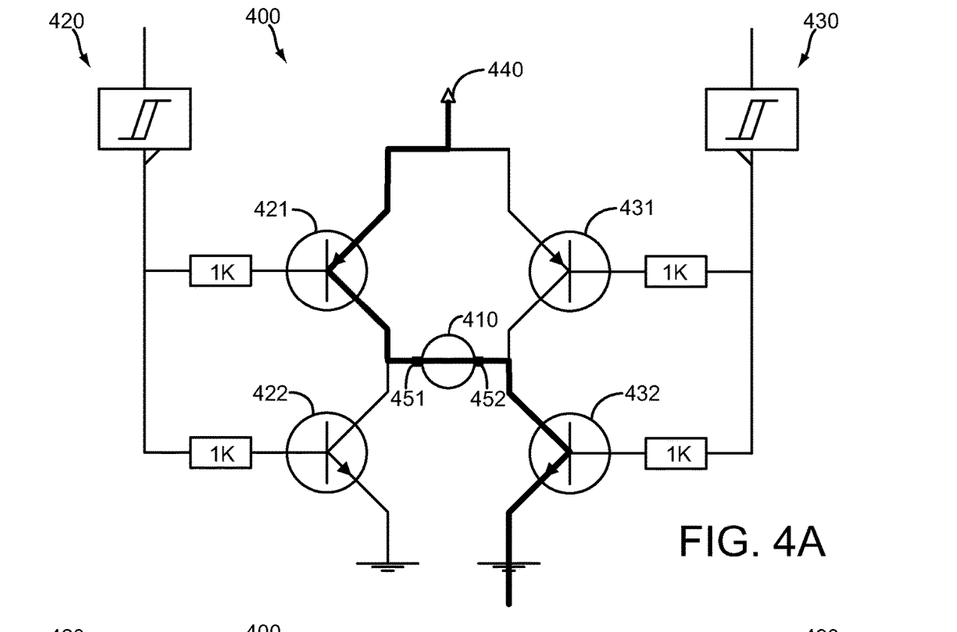
FIGS. 4A-4B show schematic depictions of an electronic circuit configured to reverse the orientation of a leak check module vacuum pump.
Figure 4B:
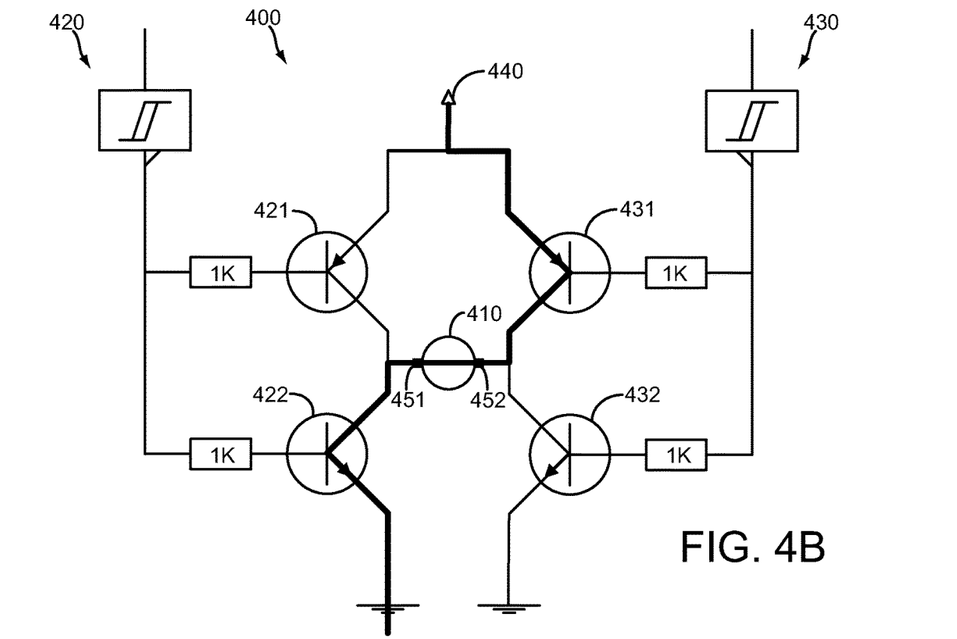

FIGS. 3A-3D show a schematic depiction of an example ELCM 295 in various conditions in accordance with the present disclosure. As shown in FIG. 2, ELCM 295 may be located along vent 227 between canister 222 and atmosphere. ELCM 295 includes a changeover valve (COV) 315, a pump 330, and a pressure sensor 296. Pump 330 may be a reversible pump, for example, a vane pump. COV 315 may be movable between a first and a second position. In the first position, as shown in FIGS. 3A and 3C, air may flow through ELCM 295 via first flow path 320. In the second position, as shown in FIGS. 3B and 3D, air may flow through ELCM 295 via second flow path 325. The position of COV 315 may be controlled by solenoid 310 via compression spring 305. ELCM 295 may also comprise reference orifice 340. Reference orifice 340 may have a diameter corresponding to the size of a threshold leak to be tested, for example, 0.02". In either the first or second position, pressure sensor 296 may generate a pressure signal reflecting the pressure within ELCM 295. Operation of pump 330 and solenoid 310 may be controlled via signals received from controller 212.

As shown in FIG. 3A, COV 315 is in the first position, and pump 330 is activated in a first direction. Fuel tank isolation valve 252 (not shown) is closed, isolating ELCM 295 from the fuel tank. Air flow through ELCM 295 in this configuration is represented by arrows. In this configuration, pump 330 may draw a vacuum on reference orifice 340, and pressure sensor 296 may record the vacuum level within ELCM 295. This reference check vacuum level reading may then become the threshold for passing/failing a subsequent leak test.

As shown in FIG. 3B, COV 315 is in the second position, and pump 330 is activated in the first direction. This configuration allows pump 330 to draw a vacuum on fuel system 18. In examples where fuel system 18 includes FTIV 252, FTIV 252 may be opened to allow pump 330 to draw a vacuum on fuel tank 220. Air flow through ELCM 295 in this configuration is represented by arrows. In this configuration, as pump 330 pulls a vacuum on fuel system 218, the absence of a leak in the system should allow for the vacuum level in ELCM 295 to reach or exceed the previously determined vacuum threshold. In the presence of a leak larger than the reference orifice, the pump will not pull down to the reference check vacuum level.

As shown in FIG. 3C, COV 315 is in the first position, and pump 330 is de-activated. This configuration allows for air to freely flow between atmosphere and the canister. This configuration may be used during a canister purging operation, for example.

As shown in FIG. 3D, COV 315 is in the second position, and pump 330 is activated in a second direction, opposite from the first direction. In this configuration, pump 330 may pull air from atmosphere into fuel system 218. In a configuration where FTIV 252 is open and CPV 261 is closed, air drawn by pump 330 may promote desorption of fuel vapor from canister 222, and further direct the desorbed fuel vapor into fuel tank 220. In this way, fuel vapor may be purged from the canister to the fuel tank, thereby decreasing the potential for bleed emissions.

FIGS. 4A and 4B show an example circuit 400 that may be used for reversing a pump motor of ELCM pump 330. Circuit 400 schematically depicts an H-Bridge circuit that may be used to run a motor 410 in a first (forward) direction and alternately in a second (reverse) direction. Circuit 400 comprises a first (LO) side 420 and a second (HI) side 430. Side 420 includes transistors 421 and 422, while side 430 includes transistors 431 and 432. Circuit 400 further includes a power source 440.

In FIG. 4A, transistors 421 and 432 are activated, while transistors 422 and 431 are turned off. In this confirmation, the left lead 451 of motor 410 is connected to power source 440, and the right lead 452 of motor 410 is connected to ground. In this way, motor 410 may run in a forward direction.

In FIG. 4B, transistors 422 and 431 are activated, while transistors 421 and 432 are turned off. In this confirmation, the right lead 452 of motor 410 is connected to power source 440, and the left lead 451 of motor 410 is connected to ground. In this way, motor 410 may run in a reverse direction.

The components of the systems described in FIGS. 2-4 may enable an active/passive purge method for a hybrid vehicle that will reduce evaporative emissions without requiring significant battery power. While a vehicle is in a vehicle-off condition, the fuel tank will develop pressure or vacuum over the course of a diurnal cycle. While under a vacuum, the fuel tank may be used to passively purge the contents of the fuel vapor canister to the fuel tank. The efficiency of this operation may be significantly increased if the contents of the fuel vapor canister are first actively purged to the fuel vapor accumulator. This active purge may be accomplished using the reversible ELCM vacuum pump to evacuate the canister. The fuel vapor may be maintained in the fuel vapor accumulator until a passive purge operation is favorable by pressurizing the system and then sealing the system by closing the canister vent valve. Using a latchable canister vent valve allows this operation to be completed with minimal battery load.

FIG. 5 shows an example flow chart for a high-level method 500 for purging a fuel vapor canister with a reversible leak check module vacuum pump via a fuel vapor accumulator. Method 500 will be described in reference to the systems described in FIGS. 1-4, though it should be understood that method 500 may be applied to other systems without departing from the scope of this disclosure. Method 500 may be carried out by a controller, such as controller 12, and may be stored as executable instructions in non-transitory memory.

Method 500 begins at 505 by estimating operating conditions. Operating conditions may include ambient conditions, such as temperature, humidity, and barometric pressure, as well as vehicle conditions, such as engine operating status, fuel level, fuel tank pressure, fuel vapor canister load status, etc. Continuing at 510, method 500 may include determining whether the vehicle is in a vehicle-off state. If the vehicle is not in a vehicle-off state, method 500 may proceed to 515. At 515, method 500 may include maintaining the fuel system status, and may further include setting a follow-up flag. A follow-up flag may be stored in controller 212, and may indicate that method 500 is to be initiated again, for example, when the vehicle-off state is met, or after a predetermined duration. Method 500 may then end.

If the vehicle-off condition is met, method 500 may proceed to 520. At 520, method 500 may include determining whether a fuel vapor canister load is above a threshold. The fuel vapor canister load threshold may be predetermined, or may be based on current conditions. The fuel vapor canister load may be determined by monitoring the quantity of fuel vapor entering the fuel vapor canister following the most recent canister purge event. Fuel vapor entering the fuel vapor canister may be quantified based on fuel tank pressure prior to venting the fuel tank, based on changes on canister temperature during fuel tank venting, based on signals from an oxygen or hydrocarbon sensor coupled within or near the fuel vapor canister, etc. If canister load is determined to be less than the threshold, method 500 may proceed to 515, and include maintaining the fuel system status.

If the canister load is above the threshold, method 500 may proceed to 525. At 525, method 500 may include determining whether entry conditions are met for an active/passive purge routine. An active/passive purge routine may include, for example, actively desorbing the contents of fuel vapor canister 222 to fuel vapor accumulator 297, sealing the fuel system from atmosphere, and then passively purging the contents of the fuel vapor accumulator to fuel tank 220 when the fuel tank is under a vacuum greater than a threshold. Entry conditions may include a positive fuel tank pressure, and a battery charge above a threshold. Conditions may also include an indication that the fuel tank pressure is likely to decrease to a vacuum greater than a threshold during the vehicle-off condition. For example, the controller may determine a temperature profile of the fuel tank based on the fuel tank temperature at the vehicle-off event, an engine temperature at the vehicle-off event, an ambient temperature, a time of day, and/or other thermal factors. In some examples, an estimated length of the vehicle-off condition may be assessed. For example, if the vehicle is parked at the user's home at the end of the day, and the user's driving patterns suggest that the vehicle will be parked overnight, the expected duration of the vehicle-off condition and an expected decrease in ambient temperature may indicate that the fuel tank is likely to develop a vacuum greater than a threshold. In other examples, if the vehicle is parked at noon in the sun at a refueling station, the fuel tank may not be likely to develop vacuum greater than a threshold, as the expected duration of the vehicle-off condition is likely to be relatively short, and the ambient temperature is likely to increase. If conditions for an active/passive purge are not met, method 500 may proceed to 530. At 530, method 500 may include setting a follow-up flag. A follow-up flag may be stored in controller 212, and may indicate that method 500 is to be initiated again, for example, when the entry conditions for an active/passive purge routine are met, or after a predetermined duration. In some examples, the fuel system may be isolated from atmosphere, for example by closing CVV 298, thereby preventing bleed emissions during the vehicle off condition.

If conditions for an active/passive purge are met, method 500 may proceed to 535. At 535, method 500 may include coupling the fuel vapor canister to atmosphere and activating an ELCM vacuum pump in the reverse direction. Coupling the fuel vapor canister to atmosphere may include opening or maintaining open the canister vent valve. Activating the ELCM vacuum pump in the reverse direction may further include placing the ELCM COV in the second position, as shown in FIG. 3D. In this configuration, the ELCM pump may facilitate the movement of atmospheric air into the emissions control system. Prior to activating the pump, the CPV and FTIV may be closed or maintained closed.

Continuing at 540, method 500 may include evacuating the contents of the fuel vapor canister to the fuel vapor accumulator. As atmospheric air is pumped into the fuel vapor canister, stored hydrocarbons will become desorbed and exit via ports coupled to the canister buffer. With the FTIV and CPV closed, the emissions control system will become pressurized with air, forcing the desorbed vapors into the fuel vapor accumulator. The evacuation may continue until the emissions control system reaches a threshold pressure. The pressure may be determined via ELCM pressure sensor 296, or another pressure sensor coupled within the emissions control system. The threshold pressure may be predetermined, or may be based on a change in pressure (e.g. two consecutive pressure measurements are within a threshold of each other, indicating a maximum pressure has been reached). In some examples, the evacuation may proceed for a predetermined amount of time, an amount of time based on the canister load, or until an indication is received that a threshold amount of hydrocarbon have been desorbed (e.g. based on changes in canister temperature or based on information received from a hydrocarbon sensor).

Continuing at 545, method 500 may include closing the CVV and turning off the vacuum pump. In configurations where the CVV is a latchable CVV, the CVV may be pulsed closed. In conjunction with turning off the vacuum pump, the ELCM COV may be returned to the first position, and/or placed in a position that does not require current or voltage to maintain the position of the solenoid valve. In some examples, the controller may be placed in a reduced power mode or sleep mode, wherein the controller maintains essential functions only, and operates with a lower battery consumption than in a corresponding awake more.

Continuing at 550, method 500 may include determining whether a fuel tank vacuum is greater than a threshold. The fuel tank vacuum threshold may be predetermined, or may be based on current operating conditions, such as fuel tank fill level. The fuel tank pressure may be determined via fuel tank pressure transducer 291. If the controller is maintained awake following the evacuation of the fuel vapor canister to the fuel vapor accumulator, fuel tank pressure may be monitored constantly or at regular intervals. If the controller has been placed in reduced power or sleep mode following canister evacuation, the controller may be awoken after a duration. The duration may be predetermined, or based on current operating conditions, such as fuel tank temperature, engine temperature, ambient temperature, time of day, etc. In some examples, the fuel tank pressure transducer may output a signal to a wake input of the controller, the wake input configured to wake the controller when the fuel tank vacuum is greater than a threshold.

If the fuel tank vacuum is not greater than the threshold, method 500 may proceed to 555. At 555, method 500 may include maintaining the evaporative emission system sealed from atmosphere. The method may further include continuing to monitor the fuel tank pressure until a threshold vacuum develops. Method 500 may then end.

If and when the fuel tank vacuum is determined to greater than the threshold, method 500 may proceed to 560. At 560, method 500 may include opening the canister vent valve (or otherwise coupling the fuel vapor canister to atmosphere) and opening the FTIV. With the fuel tank under a threshold vacuum, atmospheric air should enter the evaporative emissions system and flow to the fuel tank, carrying the desorbed fuel vapors stored in the fuel vapor accumulator to the fuel tank. In configurations where the fuel vapor accumulator is sealed with a valve, this valve may also be opened prior to or concurrent with the opening of the FTIV and CVV.

Continuing at 565, method 500 may include purging the contents of the fuel vapor accumulator to the fuel tank. This may include maintaining the FTIV and CVV open for a duration, for example, the duration necessary for the pressure within the fuel tank and evaporative emissions system to equilibrate to atmospheric pressure.

Continuing at 570, following the purging of the fuel vapor accumulator contents to the fuel tank, method 500 may include closing the FTIV and maintaining the CVV open. In this configuration, the purged fuel vapors are trapped within the sealed fuel tank, and the fuel vapor canister is coupled to atmosphere. Method 500 may then end.

FIG. 6 shows an example timeline 600 for an active/passive purge routine using the method described herein and with regard to FIG. 5 as applied to the systems described herein and with regard to FIGS. 1-4. Timeline 600 includes plot 610 indicating a vehicle-on status over time. Timeline 600 further includes plot 620 indicating the status of a canister vent valve (CVV) over time; plot 630, indicating the status of a fuel tank isolation valve (FTIV) over time; and plot 640, indicating the status of an evaporative leak check module (ELCM) change-over valve (COV) over time. Timeline 600 further includes plot 650, indicating the status of a reversible ELCM pump over time. Timeline 600 further includes plot 660, indicating a fuel tank pressure over time. Line 665 represents a vacuum threshold for performing the passive portion of an active/passive canister purge. Timeline 600 further includes plot 670, indicating an ELCM pressure over time. Line 675 represents a pressure threshold for evacuating fuel vapor canister to a fuel vapor accumulator. Timeline 600 further includes plot 680, indicating a canister load over time. Line 685 represents a threshold canister load for performing an active/passive purge routine. Timeline 600 further includes plot 690, indicating a fuel vapor accumulator load over time. A canister purge valve may be assumed to be closed throughout the timeline.

At time $t_0$, the vehicle is on, as indicated by plot 610. Accordingly, the CVV is open, as indicated by plot 620, and the FTIV is closed, as indicated by plot 630. The ELCM COV is in the $1^{st}$ position, as indicated by plot 640, and the ELCM pump is off, as indicated by plot 650. At time $t_1$, the vehicle is turned off. The statuses of the CVV, FTIV, and ELCM are maintained. The canister load, as indicated by plot 680 is above the threshold represented by line 685. The fuel tank pressure is above atmospheric pressure, as indicated by plot 660. As such, an active/passive purge routine is indicated. The fuel tank pressure increases from time $t_1$ to time $t_2$, as the fuel tank is sealed and heat continues to be rejected from the engine and atmosphere, even though the vehicle is off.

At time $t_2$, entry conditions are met for an active/passive purge routine. Accordingly, the CVV is maintained open, coupling the fuel vapor canister to atmosphere. The FTIV is maintained closed. The ELCM COV is placed in the $2^{nd}$ position, and the ELCM pump is turned on in the reverse direction, directing atmospheric air into the emissions control system. As air is pumped into to the emissions control system, fuel vapor is desorbed from the fuel vapor canister. Accordingly, the canister load decreases, as indicated by plot 680. As the FTIV and CPV are closed, the desorbed fuel vapors are diverted into the fuel vapor accumulator. Accordingly, the fuel vapor accumulator load increases, as indicated by plot 690. The pressure within the emissions control system increases from $t_2$ to $t_3$, as indicated by plot 670. Although the FTIV is closed, the fuel tank pressure increases slightly from time $t_2$ to time $t_3$ as heat enters the fuel tank.

At time $t_3$, the pressure indicated by the ELCM pressure sensor reaches the threshold represented by plot 670. This indicates the end of the active portion of the active/passive purge routine. Accordingly, the ELCM pump is turned off, and the ELCM COV is returned to the first position. The CVV is closed, sealing the emissions control system, and maintaining the pressure therewithin. From time $t_3$ to time $t_4$, the fuel tank pressure and ELCM pressure increase slightly, as heat is rejected to the fuel tank and emissions control system. However, with the pressure in the emissions control system maintained at a high level, the fuel vapor accumulator load is maintained. In other words, the fuel vapors stored in the fuel vapor accumulator are substantially maintained in the accumulator, and the canister load does not significantly increase due to hydrocarbon diffusion out of the accumulator.

From time $t_4$ to time $t_5$, the fuel tank pressure and ELCM pressure decrease, as the fuel tank and emissions control system cool while isolated from atmosphere. At time $t_5$, the fuel tank pressure reaches the vacuum threshold represented by line 665 and the vehicle is still in a vehicle-off condition. Accordingly, the entry conditions for the passive portion of the active/passive purge are met. The CVV and FTIV are both opened. The fuel tank vacuum thus draws fresh air through the canister vent into the fuel tank, carrying the contents of the fuel vapor accumulator into the fuel tank. Accordingly, the fuel tank pressure increases to atmospheric pressure, the ELCM pressure increases to atmospheric pressure, and the fuel vapor accumulator load decreases to an empty state. At time $t_6$, the systems are equilibrated. Accordingly, the FTIV is closed, trapping the fuel vapor within the fuel tank. The CVV is maintained open, coupling the emissions control system to atmosphere.

The systems described herein and with regard to FIGS. 1-2, 3A-3D, and 4A-4B, along with the method described herein and with regard to FIG. 5 may enable one or more systems and one or more methods. In one example, a method for a fuel system, comprising: during a first condition, purging fuel vapor from a fuel vapor canister to a fuel vapor accumulator; and then during a second condition, evacuating fuel vapor from the fuel vapor accumulator to a fuel tank. In some examples, purging fuel vapor from the fuel vapor canister to the fuel vapor accumulator comprises pumping air through the fuel vapor canister while maintaining a fuel tank isolation valve closed. Purging fuel vapor from the fuel vapor canister to the fuel vapor accumulator may further comprise pumping air through the fuel vapor canister while maintaining a canister purge valve closed. Pumping air through the fuel vapor canister may further comprise activating a vacuum pump coupled between the fuel vapor canister and atmosphere. The vacuum pump may be coupled within an evaporative leak check module, and may be configured as a reversible vacuum pump. In some examples, the method may further comprise: responsive to a fuel vapor accumulator pressure reaching a threshold, ceasing pumping air through the fuel vapor canister; and closing a canister vent valve. The canister vent valve may be a latchable vent valve. Evacuating fuel vapor from the fuel vapor accumulator to a fuel tank may comprise opening the canister vent valve and a fuel tank isolation valve coupled between the fuel tank and the fuel vapor accumulator. In some examples, the method further comprises: responsive to a fuel tank pressure increasing above a threshold, closing the fuel tank isolation valve. The first condition may include a canister load above a threshold, and may further include a fuel tank pressure greater than atmospheric pressure. The second condition may include a fuel tank vacuum greater than a threshold. The first and second conditions may include a vehicle-off condition. The technical result of implementing this method is a reduction in canister bleed emissions. The fuel vapor accumulator increases the volume of the fuel system, providing a temporary storage for desorbed fuel vapor. In this way, canister breakthrough of hydrocarbons can be mitigated by reducing the amount of hydrocarbons stored within the canister over a diurnal cycle.

In another example, a fuel system for a vehicle, comprising: a fuel vapor accumulator coupled between a fuel tank isolation valve and a fuel vapor canister; and a reversible vacuum pump coupled between the fuel vapor canister and atmosphere. The fuel system may further comprise a latchable canister vent valve coupled between the reversible vacuum pump and atmosphere. In some examples the fuel system further comprises: a controller configured with instructions stored in non-transitory memory, that when executed cause the controller to: activate the reversible vacuum pump to pump atmospheric air through the fuel vapor canister while maintaining the fuel tank isolation valve closed; then close the latchable canister vent valve; and then responsive to a fuel tank vacuum becoming greater than a threshold, open the latchable canister vent valve and fuel tank isolation valve. The controller may be further configured with instructions stored in non-transitory memory, that when executed cause the controller to: responsive to a fuel tank pressure increasing above a threshold, close the fuel tank isolation valve. In some examples, The controller is further configured with instructions stored in non-transitory memory, that when executed cause the controller to: following activation of the reversible vacuum pump, turn the reversible vacuum pump off responsive to a fuel vapor accumulator pressure reaching a threshold. The technical result of implementing this fuel system is an increase in the amount of fuel vapor returned to a fuel tank during a passive purge operation. By incorporating both an accumulator and a reversible vacuum pump in to the fuel system, the system may realize an increased pressure gradient between a sealed fuel tank under vacuum from a diurnal cycle and the rest of the fuel system. The pressure gradient is not needed to desorb fuel vapor from the fuel vapor canister, and instead can force the already desorbed fuel vapor into the fuel tank.

In yet another example, a method for purging a fuel vapor canister, comprising: during a vehicle-off condition, desorbing fuel vapor stored in a fuel vapor canister to a fuel vapor accumulator by pumping air through the fuel vapor canister while maintaining a fuel tank isolation valve and a canister purge valve closed; closing a latchable canister vent valve; responsive to a fuel tank vacuum increasing above a threshold, opening the fuel tank isolation valve and latchable canister vent valve; and then responsive to a fuel tank pressure increasing above a threshold, closing the fuel tank isolation valve. The technical result of implementing this method is that a hybrid vehicle may perform an efficient canister purge while the engine is off, leveraging ambient temperature decreases over a diurnal cycle to generate a fuel tank vacuum. In this way, the hybrid vehicle may purge a fuel vapor canister without forcing the engine on, thereby increasing overall fuel efficiency.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
during a first condition, purging fuel vapor from a fuel vapor canister to a fuel vapor accumulator by pumping air through the fuel vapor canister while maintaining a fuel tank isolation valve and a canister purge valve closed, the fuel tank isolation valve positioned between a fuel tank and the fuel vapor canister; and then
during a second condition, evacuating fuel vapor from the fuel vapor accumulator to the fuel tank.

2. The method of claim 1, wherein pumping air through the fuel vapor canister includes pumping atmospheric air into the fuel vapor canister.

3. The method of claim 1, wherein the fuel vapor accumulator is coupled to a conduit between the fuel tank isolation valve and the fuel vapor canister.

4. The method of claim 1, wherein pumping air through the fuel vapor canister further comprises activating a vacuum pump coupled between the fuel vapor canister and atmosphere.

5. The method of claim 4, wherein the vacuum pump is coupled within an evaporative leak check module.

6. The method of claim 4, wherein the vacuum pump is configured as a reversible vacuum pump.

7. The method of claim 1, further comprising:
responsive to a fuel vapor accumulator pressure reaching a threshold, ceasing pumping air through the fuel vapor canister; and
closing a canister vent valve.

8. The method of claim 7, wherein the canister vent valve is a latchable solenoid valve.

9. The method of claim 7, wherein evacuating fuel vapor from the fuel vapor accumulator to the fuel tank comprises opening the canister vent valve and the fuel tank isolation valve.

10. The method of claim 9, further comprising:
responsive to a fuel tank pressure increasing above a threshold, closing the fuel tank isolation valve.

11. The method of claim 1, wherein the first condition includes a canister load above a threshold.

12. The method of claim 11, wherein the first condition further includes a fuel tank pressure greater than atmospheric pressure.

13. The method of claim 1, wherein the second condition includes a fuel tank vacuum greater than a threshold.

14. The method of claim 1, wherein the first and second conditions include a vehicle-off condition.

15. A fuel system for a vehicle, comprising:
a fuel vapor accumulator coupled between a fuel tank isolation valve and a fuel vapor canister;
a reversible vacuum pump coupled between the fuel vapor canister and atmosphere; a canister vent valve that is a latchable solenoid valve coupled between the reversible vacuum pump and atmosphere; and
a controller configured with instructions stored in non-transitory memory, that when executed cause the controller to:
activate the reversible vacuum pump to pump atmospheric air through the fuel vapor canister while maintaining the fuel tank isolation valve closed; then close the canister vent valve; and then responsive to a fuel tank vacuum becoming greater than a threshold, open the canister vent valve and the fuel tank isolation valve;
activate the reversible vacuum pump to pump atmospheric air through the fuel vapor canister while maintaining the fuel tank isolation valve closed; then close the canister vent valve; then responsive to the fuel tank vacuum becoming greater than the threshold, open the canister vent valve and the fuel tank isolation valve; and
responsive to fuel tank pressure increasing above a second threshold, close the fuel tank isolation valve.

16. The fuel system of claim 15, further comprising:
following activation of the reversible vacuum pump, turning the reversible vacuum pump off responsive to a fuel vapor accumulator pressure reaching a threshold.

17. A method for purging a fuel vapor canister, comprising:
during a vehicle-off condition, desorbing fuel vapor stored in a fuel vapor canister to a fuel vapor accumulator by pumping air through the fuel vapor canister while maintaining a fuel tank isolation valve and a canister purge valve closed;
closing a canister vent valve, where the canister vent valve is a latchable solenoid valve;
responsive to a fuel tank vacuum increasing above a threshold, opening the fuel tank isolation valve and canister vent valve; and then
responsive to a fuel tank pressure increasing above a threshold, closing the fuel tank isolation valve.

* * * * *